April 18, 1961 R. B. TAYLOR 2,980,292
PROPORTIONING AND METERING DEVICE FOR LIQUIDS
Filed July 11, 1957 5 Sheets-Sheet 1

INVENTOR.
Robert B. Taylor
BY
Ooms, McDougall, Williams & Hersh
Attorneys

April 18, 1961    R. B. TAYLOR    2,980,292
PROPORTIONING AND METERING DEVICE FOR LIQUIDS
Filed July 11, 1957    5 Sheets-Sheet 5

INVENTOR.
Robert B. Taylor
BY
Ooms, McDougall, Williams & Hersh
Attorneys

United States Patent Office 2,980,292
Patented Apr. 18, 1961

2,980,292
PROPORTIONING AND METERING DEVICE FOR LIQUIDS

Robert B. Taylor, P.O. Box 626, Fort Wayne, Ind.

Filed July 11, 1957, Ser. No. 671,296

15 Claims. (Cl. 222—36)

This invention relates to a liquid handling means and more particularly to a metering device for liquids and a proportioning device for metering one or more liquids in proportion one to another for intermixing one with another or for separate delivery.

It is an object of this invention to produce a metering device formed of relatively few simple and readily available parts which are easily assembled into a sturdy and compact unit capable of extremely accurate measurement of liquids in amounts ranging from exceedingly small quantities or at very low rates of delivery to exceptionally large quantities or high rates of delivery without loss in accuracy.

Another object is to produce a device of the type described formed of relatively few simple parts which are easily assembled into a compact unit for metering one or more liquids in proportion to the metering of another liquid; in which the proportions between the liquids can be varied over a fairly wide range; in which such change in proportions can be effected in a simple and efficient manner; in which such change in proportions can be accurately determined and maintained over continuous and extended periods of operation; in which the proportioned liquids can be accurately and intimately mixed one with another or otherwise delivered separately for use; and in which the volume of liquid delivered can be accurately measured for immediate determination and control.

A further object is to produce a device of the type described which can be used as a metering device, or, interchangeably, as a metering and proportioning device for the delivery of liquids and in which such measured delivery of liquids or liquid can be effected without exposure of the liquids to moving parts in the presence of air; and in which such measured delivery can be effected without utilization of externally applied force or power other than the pressures available in the liquid system or systems being metered.

These and other objects and advantages of this invention will hereinafter appear and for purposes of illustration, but not of limitation, an embodiment of the invention is shown in the accompanying drawings in which—

Referring now to the drawings in which like numerals are used to refer to like parts in the assembly, the numeral 10 indicates an elongate housing having a center section 12, intermediate sections 14 and 16, and end sections 18 and 20. The center section 12 may be of cylindrical or of polygonal shape but, in the practice of this invention, it is preferred to form the center section 12 to square or rectangular shape for better support of elements adapted to be mounted thereon, as will hereinafter be described. The intermediate sections 14 and 16, preferably of cylindrical shape, are fixed in sealing relation at their inner ends onto the outer ends of the center section 12 to form a continuation thereof. The end sections 18 and 20 comprise cap members of cylindrical shape having an internal diameter corresponding to that of the intermediate sections. The intermediate sections 14 and 16 are secured in sealing relation to the adjacent end sections 18 and 20, respectively, by means of annular flanges 22 and 24 turned outwardly from the adjacent ends. These flanges may be secured together by suitable metal joining means or by means of bolts and nuts or other techniques well known to the industry.

Extending angularly, preferably perpendicularly from opposite sides of the central section 12 are a pair of elongate casings 26 preferably of smaller diameter than the diameters of the sections 14 and 18 of the elongate housing. Each such casing 26 comprises a closed end cylinder which, in the form illustrated, is composed of an inner section 28 of cylindrical shape, and an end section 30 secured in sealing relation to the outer end of the inner section 28. Such sections may again be joined through flanges 32 by suitable mechanical means or the sections may be otherwise joined by suitable metal joining means. Together, the sections 12, 14 and 18 and the sections 12, 16 and 20 form the main cylinders with the sections 14 and 18 and the sections 16 and 20 being identical in diameter. The sections 28 and 30 also form cylinders hereinafter referred to as the side or proportioning cylinders 26 with the cylinders of sections 28 and 30 also being of the same diameter. The relative diameters between the side cylinders and the main cylinders are a matter of choice although the side cylinders are generally of lesser diameter than the main cylinders since the liquid metered from the side cylinders will generally be but a fraction of the liquid metered from the main cylinders. The side cylinders may, however, if desired, be larger.

The aligned main cylinders are provided with pistons 34 and 36 separately mounted therein for reciprocal movement. The pistons are interconnected for conjoint movement, as by means of an elongate piston rod 38. When the pistons are in the form of diaphragm members, as will hereinafter be pointed out, it is desirable to interconnect the pistons for control of longitudinal movement in the cylinders without confinement of the cylinders with respect to radial or turning movement. Best results are secured when the ends of the piston rod are joined to the centers of the piston plates or diaphragm units such as a diaphragm member for fluid displacement well known to the industry under the trade name "Bellofram" marketed by Bellofram Corporation of Blanchard Road, Burlington, Massachusetts. On the other hand, the piston rod should be guided at its center for better control of the proportioning elements in operative engagement therewith.

The side cylinders 26 are similarly provided with a piston rod 48 having a central portion in position operatively to be engaged by a displacement means which is responsive to movement of the main piston 38 for effecting crosswise movement of the rod 48 responsive to linear movement of the rod 38 and in proportion thereto, as will hereinafter be pointed out.

Figures 3, 4, 5, 6, 7, 8:
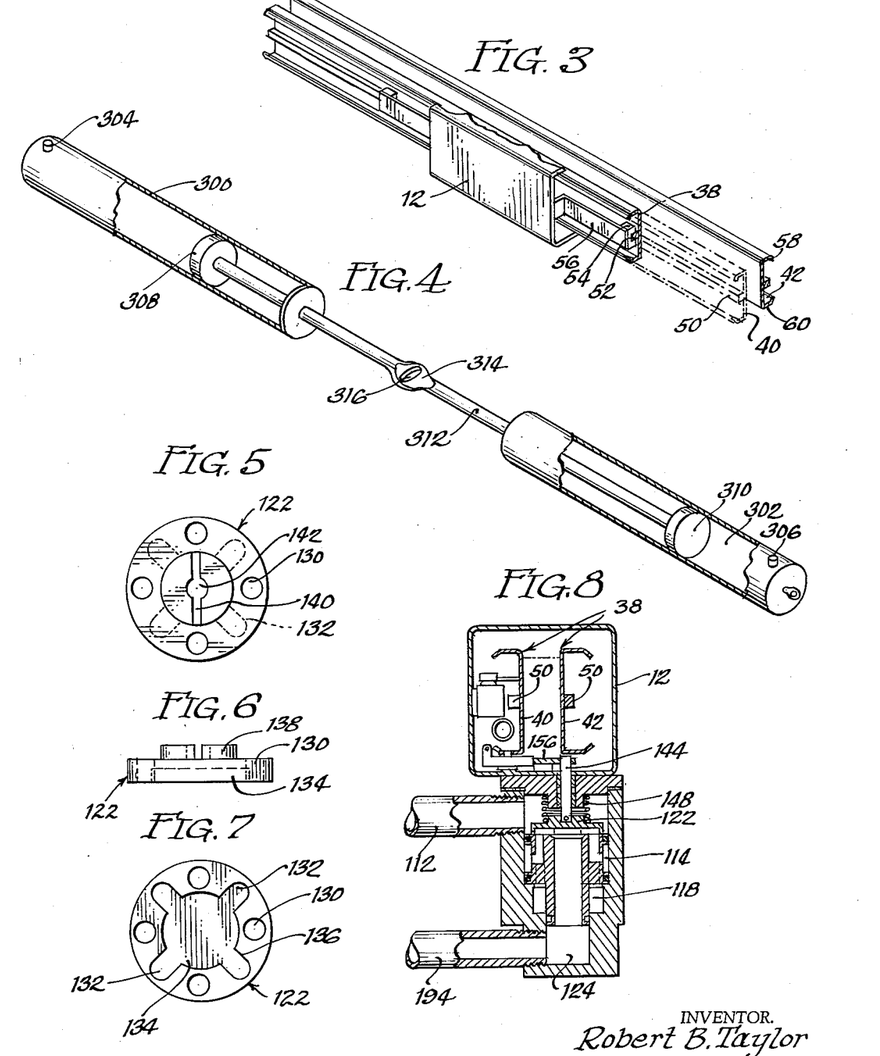
Fig. 3 is a fragmentary perspective elevational view of the piston guide means in the assembly of Fig. 1.
Fig. 4 is a perspective view partially in section of a piston and cylinder assembly for operational control of a control valve.
Fig. 5 is a top plan view of an element in the valve shown in Fig. 2.
Fig. 6 is an elevational view of the element shown in Fig. 5.
Fig. 7 is a view from the bottom side of the element shown in Fig. 5.
Fig. 8 is a sectional view taken across the center of the assembly shown in Fig. 1.

As illustrated in Figs. 3 and 8, the piston rod 38 is formed of elongate members 40 and 42 each having a guide rail 50 extending outwardly along the center thereof to be received in sliding relation within a recess 52 formed in a guide block 54 secured in longitudinally spaced apart relation to supporting strips 56 rigidly fixed to the central section 12 of the elongate housing. The piston rods 40 and 42 can also be formed with flanges 58 and 60 extending outwardly and then inwardly in the direction to engage the outer edges of the guide blocks 54 in sliding relation. It will be understood that other conventional means such as roller guides, guide blocks and the like, may be employed within the central portion of the elongate housing as a guide support for the piston rod at its center where its axis crosses the axis of the side cylinders.

When, as is preferred, the side pistons 44 and 46 are also dimensioned to be in spaced relation with the cylinder walls, the pistons can be supported concentrically within the side cylinders on the ends of the piston rod 48. Means should also be provided to guide the rod in reciprocal movement. One such means, illustrated in the drawings, comprises bearing members 62 and 64 mounted in the spaced walls of the center section 12 through which the piston rod 48 extends. It will be understood that other guide means might be employed for supporting the piston rod 48 in reciprocal movement.

If, as is preferred, a diaphragm means 66 is employed for effecting displacement of fluids into and out of the cylinders, use is made of fluid and vapor impervious extensible member fixed intermediate its ends to the ends of the pistons for conjoint movement therewith while the peripheries of the extensible members are adapted to be received in sealing relation between the flanged members 22 and 24 in the main cylinders and between the flanged members 32 in the side cylinders, respectively. Such diaphragm means for fluid displacement are well known to the industry under the trade name "Bellofram" marketed by Bellofram Corporation of Blanchard Road, Burlington, Massachusetts. Suffice it to say that the peripheral edge of the extensible diaphragm is secured in sealing relation to the walls of the cylinder intermediate its ends and that the diaphragm is dimensioned to enable movement of the piston through its entire stroke from its retracted position to extended position with portions of the diaphragm doubling up in the space between the piston and the cylinder walls, when in other than retracted or extended positions, as illustrated in the cylinders of Figs. 9, 10, 11 and 12 of the drawings.

Having described the piston and cylinder displacement, description will now be made (Figs. 9-12) of the means for transposing reciprocal movement of the main pistons 34 and 36 into displacement of the side pistons 44 and 46 with means for varying the extent of such relative movements from a maximum to zero. For this purpose, there is provided an elongate proportioning bar 70 mounted between the spaced piston rods 40 and 42 with the outer end portion of the bar pivoted at 72 on a bearing 74 fixed to a portion of the rods, preferably in offset relation from the center. The inner or free end of the bar 70 is pivotally mounted at 76 onto a bearing block having an opening received in threaded relation onto a threaded shank portion 78 of an elongate bolt or screw 80. A guide block 82, pivotally mounted onto the piston rods as by means of a pin 84, is provided with an opening through which the bolt 80 extends and means are embodied in the guide block to permit turning movement of the bolt without relative endwise movement. Means, such as a knurled head 86, is provided on the end of the bolt to facilitate rotational movement and the head is preferably graduated to enable turning movement to a predetermined position for setting the proportioner. The proportioning bar 70 extends through a slot 88 provided in the central portion of the side piston rod 48. The frictional resistance to relative movement between the bar 70 and rod 48 is minimized by means of antifriction members 90, one of which is fixed in position and the other of which is urged, as by means of a spring 92, into intimate contact with the bar. The spring is calibrated to provide a force greater than that required to operate the side piston rod 48 so as to effect displacement of the side pistons as distinguished from the bearings 90. Use can be made of roller bearings, nylon slides and the like antifriction means in contact with the bar for minimizing frictional resistance to relative movement.

Figure 9:
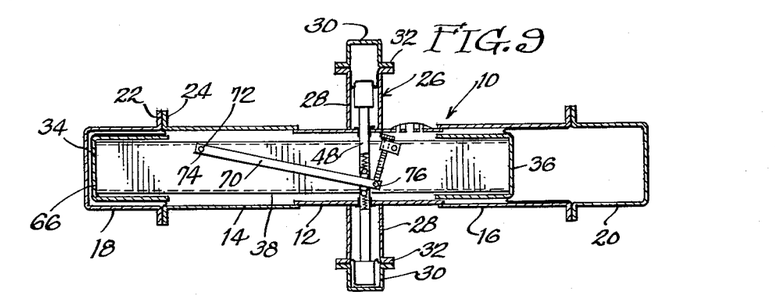
Figs. 9–12 are schematic sectional elevational views through the center of the proportioning device shown in Fig. 1 illustrating the arrangement of parts in various positions of adjustment.
Figure 11:
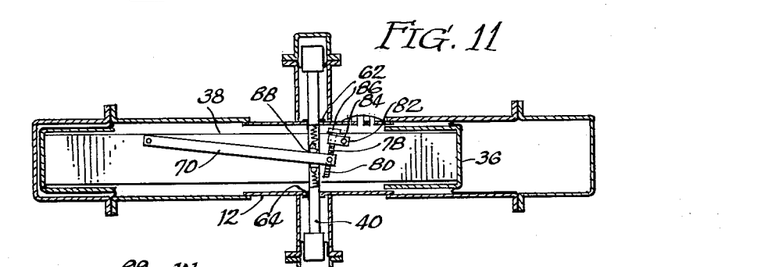
Figure 12:
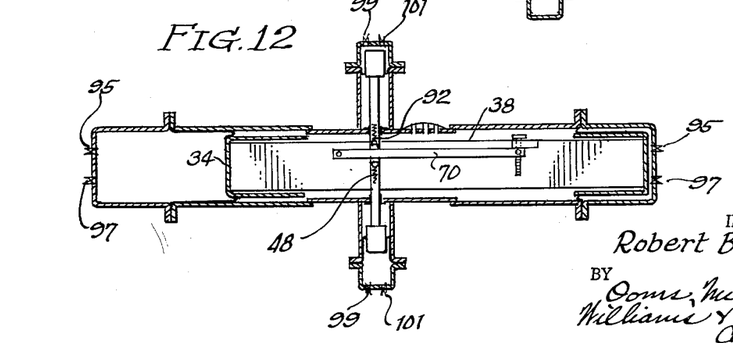
Figure 13:
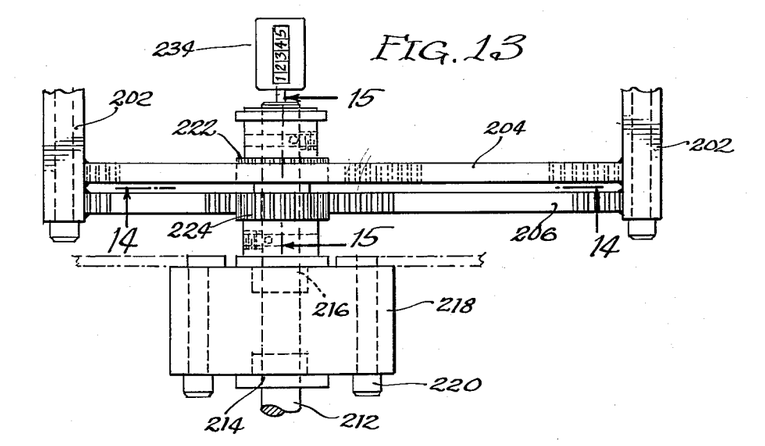
Fig. 13 is a top plan view of a metering attachment for the assembly in Fig. 1.
Figure 14:
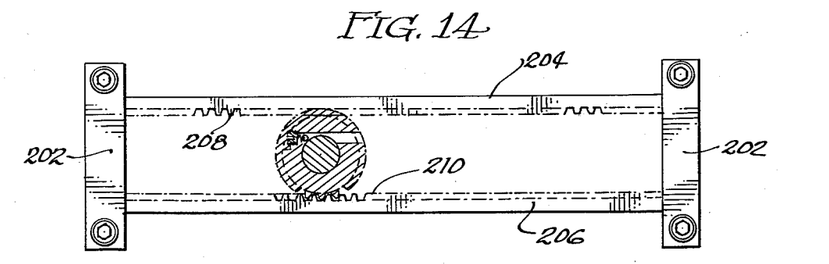
Fig. 14 is a sectional view taken along the line 14—14 of Fig. 13.
Figure 15:
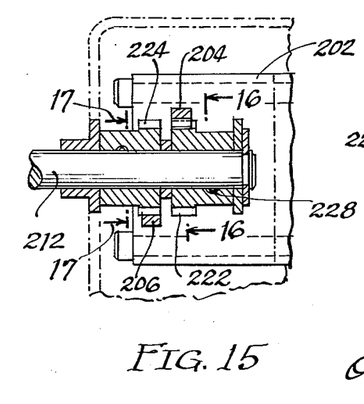
Fig. 15 is a sectional view taken along the line 15—15 of Fig. 13.
Figure 16:
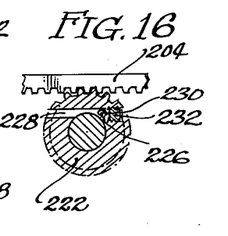
Fig. 16 is a sectional elevational view taken along the line 16—16 of Fig. 15.
Figure 17:
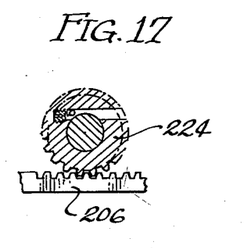
Fig. 17 is a sectional elevational view taken along the line 17—17 of Fig. 15.

By means of the graduated knob 86, it is possible to effect turning movement of the bolt 80 for adjustment of the angular position of the proportioning bar extending lengthwise along the axis of the main cylinder assembly. By turning movement of the calibrated knob 86 in one direction or the other, the proportioning bar may be adjusted from a maximum angle, as illustrated in Fig. 9, through an intermediate angle, as illustrated in Fig. 11, to a zero position, as illustrated in Fig. 12. Such adjustment can be accomplished in a simple and efficient manner by removing a plate in the central section 12 for access to the graduated knob when the knob is located within the housing. The knob can be located outside of the housing when suitable arrangements are made to enable the knob to shift with the piston rod longitudinally of the housing. When the knob is located outside of the housing, the desired turning movement of the bolt in one direction or the other can be effected for raising or lowering the bearing support 76 for the free end portion of the proportioning bar 70 to increase or decrease its angle.

With reference to the proportioning bar, it will be understood that the bar element may be otherwise positioned with respect to the main cylinder. That is, it may be positioned adjacent one of the piston rods as distinguished from between the rods and it also may be pivotally mounted for the desired angular adjustment on elements operative with the piston rods as distinguished from being connected directly thereto. The requirement for operation of the proportioning bar to effect proportional displacement of the side pistons with respect to the main pistons resides in the arrangement of the proportioning bar for conjoint movement with the main cylinders for retracted to extended positions and the ability to maintain the bar in a predetermined angular relationship with respect to the direction of such movement for effecting the camming action of the piston rod 48 in displacement responsive to displacement of the main cylinders, as will hereinafter be described.

Figure 10:
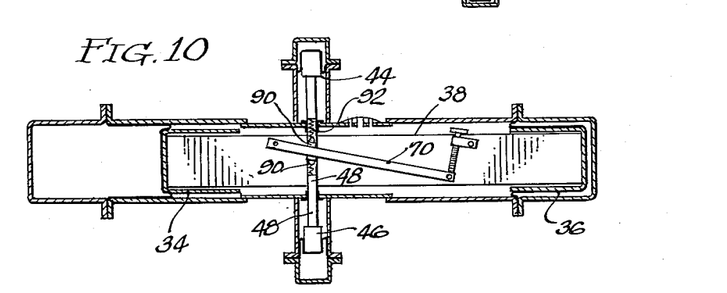

The angular position of the proportioning bar 70 will thus determine the amount of displacement of the side pistons 44 and 46 responsive to reciprocal movement of the main pistons. This is because the piston rod 48 is constantly in operative engagement with portions of the proportioning bar extending through the opening 88 in the piston rod 48 to displace the rod crosswise corresponding to the crosswise position of the portion of the bar in operative engagement therewith. Thus when the bar is in its extreme position, as illustrated in Figs. 9 and 10, the slope of the bar, which is at a maximum, will provide for a maximum rate of displacement of the cross pistons in proportion to the linear movement of the main pistons. When, as illustrated in Fig. 9, the main piston 66 is in its extended position, the side piston 46 will be in its most extended position. The side pistons will normally be returned to a starting position when the main pistons are displaced toward their retracted position by reason of the fact that the portion of the bar engaged will normally be the same with respect to the pivot point while in that position.

As the angular relation of the proportioning bar 70 is decreased, as illustrated in Fig. 11, the rate of displacement of the side pistons in proportion to the displacement of the main pistons will also be decreased. When the proportioning bar is adjusted to extend at a zero angle from its pivot point, as illustrated in Fig. 12, the main cylinder can be operated in reciprocal movement without causing any displacement of the side pistons thereby to enable fluid displacement of one without causing proportional fluid displacement from the other.

With reference to Figs. 9 and 10, it will be apparent that when the main piston assembly is moved from the extended position of Fig. 9 to the retracted position of Fig. 10 the proportioning bar 70 cams the piston rod 48 in the upward direction (in the drawing) to cause displacement of the side pistons 44 and 46 to their upper position of adjustment, causing a discharge of liquid from the top cylinder 26 as arranged in Figs. 9 and 10, while permitting intake of liquid in the corresponding bottom cylinder. It will be apparent that reverse movement of the main pistons from retracted to extended position will cause concurrent movement of the proportioning bar 70 in the direction to the right in Figs. 9–12 with the result that the piston rod 48 will be cammed downwardly by the bar to cause displacement of the side pistons from their raised to their maximum lowered position thereby to deliver liquid from the lower cylinder while taking liquid into the upper cylinder in direct proportion to the amount of liquid that is displaced by the main cylinders.

The same actions occur in the arrangement illustrated in Figure 11 with the exception that the travel of the piston in the downward direction to its extended position will be less than that which occurred in Figs. 9 and 10 by reasons of the fact that the proportioning bar has been adjusted with the free end portion pivoted from an intermediate section of the bolt 80 to provide a lesser angle from its pivot 72. As a result, the discharge of liquid from the side cylinders and the intake of liquid therein will be correspondingly less by way of proportion to the liquid displaced by the main cylinders.

In the arrangement shown in Fig. 12 wherein the proportioning bar is adjusted to its upper position of travel on the bolt into substantial alignment with its pivot 72 at the opposite end so as to provide for zero angular displacement, the travel of the side pistons will be zero in proportion to the travel of the main cylinders to the end that liquid will be delivered by the main cylinders without any proportioning from the side cylinders. It will thus be obvious that by proper adjustment of the angular relationship of the proportioning bar, the amount of liquid delivered by the side cylinders in proportion to that which is delivered from the main cylinder can be accurately controlled from zero to any desired amount, depending upon the stroke of the cylinders, the angular positions possible with respect to the proportioning bar and the capacities of the respective cylinders. The amount of travel of the proportioning side pistons and the capacity of these pistons together with their construction merely constitute matters of machine design for supply of any reasonable proportion of liquid as between the liquid delivered from the main cylinder and the liquid delivered from the side cylinders. In the modification described, the proportionate movement of the side pistons with respect to the main pistons can be roughly represented as the co-tangent of the angle between the proportioning bar and the main axis of the main pistons. For greater flexibility in adjustment, it is desirable to locate the pivot point 72 in an offset relationship from the axis of the main cylinders to provide greater flexibility with respect to angular adjustment.

It will be understood that each of the cylinders described will be provided with an inlet and an outlet as represented by the numerals 94 and 96, respectively. The inlets to the cylinders may be brought together for diffusion one with the other or the outlets of the main cylinders may be joined one to another and the outlets of the side cylinders may be joined one to another for separate diffusion in use.

It has been found that the accuracy of the device described is exceptionally great since actual measurements have established that, with a given area of cross-section of the pistons, a travel of the said pistons of a predetermined distance will deliver an equal volume of liquid and that the volume will correspond also to the area of the piston cross-section in square inches.

Since the volumetric displacement of the pistons will be constant under equivalent conditions and since the length of travel of the side pistons bears a mathematical relationship to the length of travel of the main pistons, the amount of liquid delivered by the side cylinders will, of necessity, be accurately proportioned at all times with respect to any given setting of the machine and with respect to the amount of liquid delivered from the main cylinders and the travel of the pistons therein. Thus, if the total distance traveled by the pistons in any one or both of the cylinder assemblies can be accurately determined, the total volume of fluid displaced and discharged by the main cylinders or from the side cylinders can be determined. This enables use of the device described as metering means for liquids thereby to provide accuracy to such metering operations and also to provide means for recording the amount of liquid delivered. The measurement for the length of travel of either or both of the pistons can be accomplished without limitation with respect to the operation of the device.

The foregoing briefly describes the means by which delivery of one liquid can be achieved in accurate proportion with respect to delivery of another liquid and whereby calculation of the stroke of the delivery of one of the liquids can be adapted for metering the amount of liquids delivered from the system in operation. Since the device described is reciprocal in its operation, it remains that the portions of the cylinders beyond the piston heads will be alternately receiving and delivering liquid. This condition prevails with respect to the side cylinders as well as the main cylinders or any combination of additional side cylinders therewith. An important concept of this invention resides further in a suitable four-way valve mechanism which has been found to be particularly well adapted for use with a device of the type described to avoid leakage and which can be swiftly shifted from one position to another with comparatively little force. Many of the valve systems heretofore employed can be adapted for use with a proportioning and metering device of the type described but they generally require too great angular travel and too much force to operate. It has been found that the more work required to be performed by the meter or proportioner described, the greater will be the loss in pressure through the device. Thus it is desirable to make use of a valve mechanism having the desired angular travel and which requires little force for operation. In the system described, it is desirable to make use of a valve mechanism which is positive and quick in operation in order to avoid interruption in the delivery of liquid from the device and to avoid surge in the delivery liquid pressure.

Figures 1, 2:
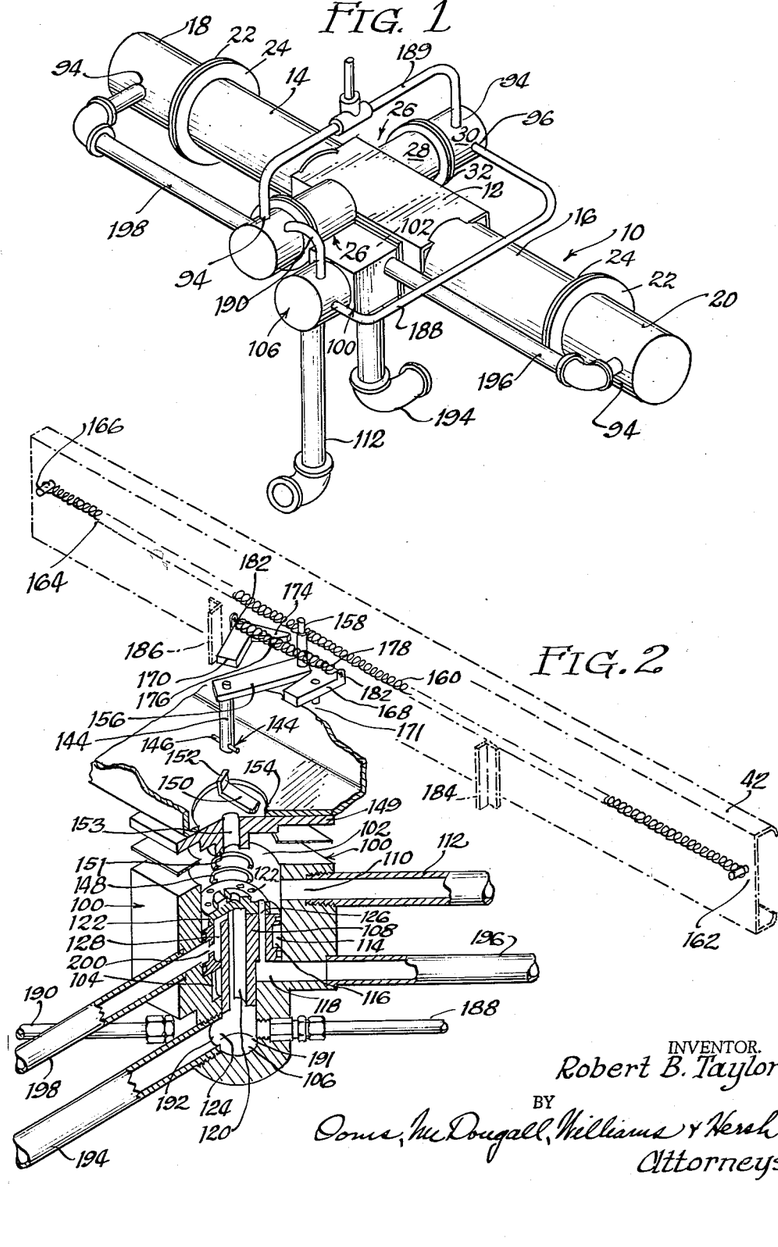
Fig. 1 is a perspective elevational view of a metering and proportioning device embodying the features of this invention.
Fig. 2 is a fragmentary sectional elevational view of the valve system employed in combination with the metering and proportioning device of Fig. 1.

Referring now to Fig. 2, the valve mechanism comprises a housing 100 formed with a chamber of decreasing dimension extending stepwise from top to bottom of the housing to provide sections 102, 104 and 106. An insert 108, preferably in the form of an elongate section, is received in fitting relation within the lower part of the chamber in a manner to militate against relative turning movement. The insert is fitted with suitable sealing members to minimize leakage of liquid along the walls of the chamber.

An inlet passage 110 through the housing 100 communicates an intake pipe 112 with the upper portion of the chamber 102. The insert 108 is formed with an annular recess 114 intermediate its ends to provide an annular chamber 116 dimensioned to have a cross-section which is equal to or slightly greater than the cross-sectional area through the bore of the intake pipe 112 so that the chamber 116 will accommodate the volume of primary liquid delivered to the device through the intake pipe 112. Another annular recess is formed in the insert separate and apart from and preferably spaced below the first to provide an annular passage 118 which is also dimensioned to have the characteristics of the first for providing a capacity for handling all of the liquid delivered by the intake pipe 112. The insert member 108 is formed with a central passage 120 which extends continuously therethrough from a valve member 122 in the form of a disc plate preferably positioned in sealing relation onto the top side of the insert 108 to an open chamber section 124 at the other end. The passageway 120 is also dimensioned to have an area in cross-section as great or slightly greater than the area of the cross-section of the intake pipe 112 to permit the entire volume of liquid to be handled therethrough without the build-up of back pressure and with minimum pressure locks.

The insert 108 is further provided with a plurality of passages which extend downwardly from the top through a substantial length of the insert in the area between the center of the insert and its outer wall with the passages being equally spaced one from the other in a uniform pattern about the center. In the modification illustrated, the insert 108 is shown with eight passages although more or less can be employed, though preferably in even numbers. Alternate passages 126 extend continuously through the insert into communication with the chamber 118. The other passages 128, in between, extend continuously through the insert into communication with the annular chamber 116. The sum of the cross-sectional areas of each of the groups of passages 126 and 128, respectively, is intended to be at least equal to, if not greater than, the cross-sectional area of the intake pipe. Thus more than one passage is preferably employed in each group although one would be sufficient if of adequate dimension.

In the arrangement of the passages and in the selection of their dimension, it is desirable to arrange the passages on a circumference of a circle the diameter of which is determined by the diameter of the passages and the spaced relation therebetween. The passages 126 and 128 should be spaced one from the other by an amount wherein the centers between adjacent passages have a greater spaced relationship than the diameters or crosswise dimensions of the passages so that, when the valve is operated, a complete block against fluid flow can be obtained during adjustment from one position to another.

The valve 122 is mounted for rotational movement adjacent the top side of the insert 108. It may be formed of any suitable material which is resistant to the fluids being handled as represented by such materials as metal, nylon, polytetrafluoroethylene, carbon, rubber, polyester plastics, and other synthetic resinous and rubber-like materials and combinations thereof. In the alternative, the valve member 122 may be fabricated of a suitable metal or combinations of metals or of a molded glass or plastic material.

With reference to Figs. 2, 5, 6 and 7, the valve 122 comprises a disc member having a plurality of openings extending therethrough from top to bottom corresponding in number to the openings of each group 126 or 128 through the insert 108 and having the same spaced relation so that the openings 130 of the valve member will be in communication with one group of passages through the insert while in one of its positions of adjustment and with the other group of openings in the other of its positions of adjustment. The valve member 122 is formed with a circular recessed portion 134 which extends upwardly from the underside part way through the disc member and which is dimensioned to have a radius which is short of the openings 130 so as to provide a spaced relation between said openings and the circular recess 134. A slot 136 extends outwardly from the recess 134 between the openings 130 into communication with the openings 132. The top side of the valve member 122 is provided with a circular section 138 which extends upwardly from the surface thereof and is formed with a crosswise slot 140 extending outwardly from a circular section at the center 142 adapted to receive a valve pin 144 having arms 146 which extend outwardly into the slots 140 to effect rotational movement of the valve member 122 with the pin. It will be understood that other suitable means may be employed to transmit turning movement of the valve in response to the change in direction of movement of the pistons.

It is desirable to maintain intimate contacting relationship between such surfaces of the valve and inserts for minimizing leakage therebetween. The sealing relation is enhanced by means constantly urging the valve part 122 resiliently into engagement with the insert, as by means of the coil spring 148 mounted between the top side of the insert to encircle the projection 138 and between the bottom side of a cover plate 149 and about a projection 151 extending downwardly therefrom. The pin 144 extends downwardly through a bearing opening 153 in the cover plate 149 and into engagement with the valve part 122 with the arms 146 of the pin 144 extending laterally through the groove 140 to effect oscillations of the valve part in response to turning movement of the pin 144.

In operation, it is desired to effect the described oscillations of the valve part 122 by an amount to shift the openings 130 in registry with one group of passages 126—128 into registry with the adjacent passages of the other group. It is desired concurrently to achieve oscillating movement of the valve part 122 and the change in direction of movement of the main pistons 34—36 in response thereto. The angular relation for turning movement of the valve part 122 will correspond to the angle of 360° divided by the number of passages through the valve part, which, in the illustrated modification, is about 45°. Oscillations of the pin are limited to the desired degree by means of a yoke 150 fixed to the housing and having end portions 152—154 turned upwardly into the path of the lever arm 156 to stop the lever arm in its limiting positions of adjustment. The latter is fixed to the upper end of the pin 144 for turning movement therewith.

Actuation of the pin 144 in turning movement to effect adjustment of the valve part 122 concurrently to the direction of movement of the piston rods will now be described. Rigid with the lever arm 156 and extending upwardly therefrom is a pin 158. A coil spring 160 is anchored at one end onto the pin 158 while the far end is hooked onto a stud 162 fixed to a longitudinally spaced portion of the piston rod 40—42. Another coil spring 164 is secured at its inner end onto the pin 158 while the other end is similarly hooked onto a stud 166 fixed to the piston rod in the direction away from the stud 162 but in axial alignment therewith.

Latching means are provided for holding the lever arm 156 in one or the other of its operated positions until the piston rod 40—42 has substantially completed its stroke and means are provided for operative engagement to inactivate the latching means to release the lever arm 156 for movement from one operated position to the other where it remains until again released upon return of the piston rod to its starting position. As illustrated, the latching means comprises a pair of dogs 168 and 170 separately mounted for pivotal movement upon pins 171 spaced to each side of the actuating pin 144. The dogs are adapted to be rocked upon their pivots between a normal position, illustrated by the dog 168 in Fig. 2, and operated position, illustrated by the dog 170 in the same figure. The dogs are formed with arms 174 extending in the direction toward each other and between which the end portion of the lever arm 156 is oscillated and hooks 176 are provided on the ends of the arms in spaced relation from the body portion by an amount to enable the lever arm to be received in latching relation therebetween. The dogs are constantly urged towards normal position in the direction towards each other, as by means of a coil spring 178, secured at its outer end onto bracket 182 extending upwardly from the far side of the dogs beyond the pivot.

Limit blocks 184—186, mounted for displacement with the piston rods 40—42, are spaced one from the other on the rods by an amount to bring one block 184 into operative engagement to rock the dog 168 from normal to operated position responsive to movement of the piston rod in completing its stroke in the direction to the left in Fig. 2 and to bring the block 186 into operative engagement for actuation of the other dog 170 responsive to completion of the stroke of the pistons in the opposite direction.

The chamber 124 can be used as a mixing chamber, as when the proportioned liquid delivered by the side cylinders 28 is caused to flow through conduits 188—190 and through diffusion nozzles 191 into the chamber 124 for mixing with the primary liquid caused to flow through the passage 120 into the same chamber. The liquids introduced into the chamber 124 flow from the mixing chamber through the outlet 192 into the delivery tube 194.

The valve mechanism described is intended to be used with liquids under positive pressure. It will be understood, however, that the pistons in the proportioning cylinders can be modified for operation with double extensible diaphragms to permit suction as well as pressure discharge whereby the valve system could be operated under subatmospheric conditions.

In operation of the valve, the main stream of liquid under positive pressure flows from its supply source through the intake pipe 112, the inlet 110, and into the chamber 102. The pressure of the liquid operates to assist the coil spring 148 to urge the valve part 122 into a better sealing relation with the insert 108. The liquid, from the chamber 102, passes through the openings 130 and into the passages 126 in registration therewith. From the passages 126, the liquid flows into the chamber 118 and into the tubing 196. The tubing 196 joins the chamber 118 with the inlet in the head end of one of the main cylinders 20 forcing the piston 36 away from the head end of the cylinder and accumulating liquid in the cylinder portion between the extensible diaphragm and the head end of the cylinder. Since the extensible diaphragm 66 is secured in sealing relation circumferentially between the flanges 22—24, the liquid cannot pass beyond the diaphragms. As a result, the working parts of the mechanism are excluded from contact with the liquid.

Movement of the pistons 34—36 in the direction to the left in Figs. 9–12 causes the liquid in the opposite cylinder 18 to flow from the cylinder into the tubing 198 in communication with the inlet 200 and the chamber 114. The liquid flows from the chamber 114 upwardly through the passages 128 into the recessed portion 134 on the underside of the valve part 122. From the recess 134, the liquid flows downwardly through the central passage 120 into the mixing chamber 124. If liquid is being atomized into the chamber from the passages 188 and 190, the two liquids will become mixed one with the other for flow together through the delivery tube 194. In the event that a mixed liquid is not introduced, the primary liquid will flow through the passage 120 and into the chamber 124 and then out through the delivery tube 194. To facilitate intermixing of liquids in the mixing chamber, baffles or other suitable means may be provided therein.

As the main piston assembly continues in its movement in the direction to the left in the figures, the tension on the spring 164 is increased while the tension on the spring 160 is decreased thereby to urge the lever arm 156 for rocking movement in the counter-clockwise direction but such movement is resisted while the lever arm 156 is held in position by the dog 168. As the piston completes its stroke to the left, the block 184 comes into operative engagement with the rearwardly extending portion of the dog 168 to cause the dog to be rocked in the clockwise direction about its pivot to release the lever arm 156. When released, the tensioned lever arm snaps over into its other position of adjustment defined by the stop 152 and the end portion of the lever arm becomes engaged by the hook end 176 of the dog 170 to hold the lever arm in its adjusted position. Concurrently with the adjustment of the lever arm 156, the pin 144 in operative engagement with the oscillating valve part 122 causes the valve to be rotated through the angle of 45° to bring the openings 130 out of registry with the passages 126 and into communication with the passages 128 while the recess 134 in the bottom side of the valve part 122 is adjusted for communication with the passages 126. This reverses the flow of fluids from the chamber 102 through the openings 130 into the passages 126. From the passages 128, the feed liquid enters the chamber 114 for flow through the tubing 198 into the head end of the other cylinders. The fluid in the cylinder to the left is forced from the cylinder through the tubing 196 and into the chamber 118. From the chamber 118, the liquid flows through the passages 126 into the recess 134, then down passage 120 and into the mixing chamber 124 for passage through the delivery tube 194.

While less accurate than a valve system of the type described for control of the flow of fluids into and out of the cylinders, use can be made of check valves either in the inlets and outlets of the cylinders, as represented by the numerals 95, 97, 99 and 101 in Fig. 12 of the drawings, or such check valves may be located in the pipes or tubing leading to the cylinders, as in passages 188, 189 and 196.

In the alternative, use may be made of other means for effecting the desired control with respect to rocking movement of the lever arm 156. As illustrated in Fig. 4 of the drawings, use may be made of a pair of air cylinders which operate in a manner similar to that of a door check wherein the air cylinders are joined together by a connecting shaft having an opening therein for engagement with the pin 158. Such modification is illustrated in Fig. 4 wherein the numerals 300 and 302 represent cylinders located in endwise relation with a spacing therebetween for attaching to the opposite ends of the piston rods 40—42. Each of the cylinders 300 and 302 are provided with check valves 304 and 306. Operative within the cylinders are pistons 308 and 310, respectively, joined together by a common piston rod 312 having a widened portion 314 at the center formed with a slot 316 into which the pin 158 extends. In operation, the piston rod 312 remains generally stationary while the cylinders travel with the piston rod 40—42 alternately developing pressures at the heads of the cylinders to urge the piston rod 312 in the direction opposite the pressure developed. Thus it becomes possible to provide for quick movement of the piston rod and the pin 158 operatively engaged thereby. Any leakage in the cylinders beyond the pistons 308 and 310 can be replenished through the check valves 304—306 as the operation proceeds. It will be understood that other means for the operation of the pin 158 and the lever arm 156 responsive to movements of the piston rods 40—42 to their limiting positions may be employed.

As previously pointed out, the system described can be adapted accurately to meter liquids either from the main cylinder or from the combination of the main cylinder and proportioning cylinders operative therewith. An important concept of this invention resides in the means operative in connection with the pistons for effecting the desired metering and measuring operations.

In Figs. 13-17, a pair of end plates 202 are secured for conjoint movement with the piston rods 40—42. A pair of rack bars 204—206, dimensioned to have a length greater than the stroke of the pistons, are secured at their ends to the end plates 202 with the rack teeth 208 and 210, respectively, extending inwardly in the direction towards each other. In the assembled relation, the racks are disposed at different levels, such for example as with the rack 204 at a higher level and in a plane offset from that of the rack 206. A shaft 212 journalled in suitable bearings 214 and 216 is mounted for free rotational movement in a housing 218 secured, as by bolts 220, to a portion of the cylinder housing with a portion of the shaft 212 extending upwardly through the space midway between the racks 204 and 206. Mounted on the shaft 212 for rotational movement thereon are a pair of gear members 222 and 224 one of which is in alignment with the rack 204 while the other is in alignment with the rack 206 with the teeth of the gears constantly meshed in engagement with the teeth of the respective racks.

Gears 222 and 224 are each provided with clutch mechanism, either incorporated as a part thereof or in operative association therewith to permit free movement of the gears in one direction while furnishing substantially instantaneous engagement between the respective gear and the shaft 212 during rotation of the gear in the opposite direction. The gears 222 and 224 are continuously in mesh with the gear teeth 208 and 210 of both racks and the clutch mechanisms are arranged so as to effect concurrent turning movement of the shaft 212 during turning movement of one gear in one direction and the other gear in the opposite direction. Various types of clutch devices may be employed. One system illustrated in the drawings represents a ball type clutch in which a ball member 226 operative in an opening 228 in the gears 222—224 is resiliently urged into operative engagement with a portion of the shaft 212 blocking passage of the ball 226 through the opening. The ball is urged into the direction towards the shaft by means of a coil spring 230 or the like located within the opening beyond the shaft. The tension of the spring may be adjusted by the screw 232 threadably received within the opening and against which the end of the coil spring bears. In actual practice there will usually be a plurality of such balls or rollers arranged about the shaft for actuation into operative engagement with the shaft for effecting turning movement of the shaft with the gear in one direction while permitting the gear to turn independently of the shaft in the other direction. A clutch mechanism of this character is well known through the industry. A preferred clutch device makes use of a clutch member mounted for rotational movement on a spring wound shaft to permit free relative turning movement in one direction and concurrent turning movement in the opposite direction. In effect, the spring unwinds during turning movement but immediately winds itself back when turning movement in the one direction is stopped. Clutches of the type described, which are well known to the art, are referred to as overrunning clutches, as manufactured by Precision Specialties Company of Kansas City, Missouri.

Thus in the system described linear movement of the racks 204 and 206 in either direction will cause the shaft 212 to rotate in one direction and always in the same direction since one gear will be effective to effect rotational movement of the shaft during movement of the rack in one direction while the other gear will be effective to effect rotational movement of the shaft in the same direction during linear movement of the racks in the opposite direction.

A counter 234 of conventional construction is mounted operatively to engage the shaft to indicate the number of revolutions or fractions of revolutions made by the shaft. Since the number of rotations of the shaft 212 is related directly to the total distance travelled by the racks 204 and 206 in both directions and since the movement of the racks corresponds to the movement of the main pistons and the pistons of the proportioning unit, the counter will relate directly to the linear movement of the pistons to provide a high degree of accuracy with respect to the amount of liquid dispensed thereby.

It is desirable to prevent play between the racks and pinions for avoiding error with respect to the amount of displacement. For this purpose, the racks are preferably constructed in two halves with one half superimposed upon the entire length of the other and with one of such half units being spring loaded so that the mesh of the pinion with the rack will be free of any uncontrolled movements. Thus the exact displacement of the pistons can be related to the counter for calculation with great accuracy of the amount of fluid flow through the metering and proportioning device.

Figure 18:
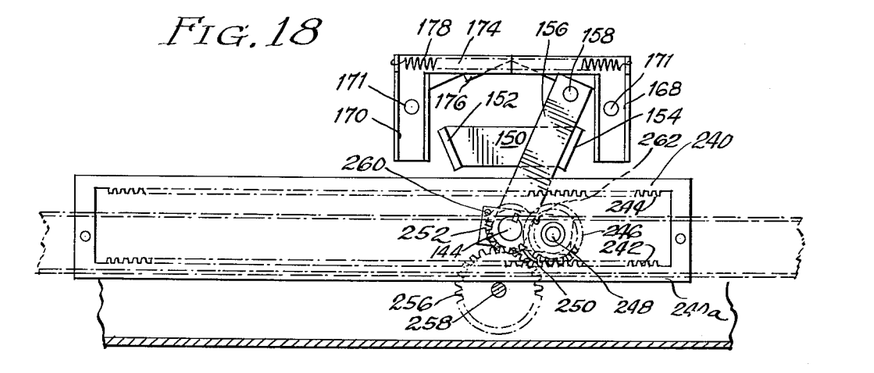
Fig. 18 is a plan view of a modified form of measuring means.
Figure 19:
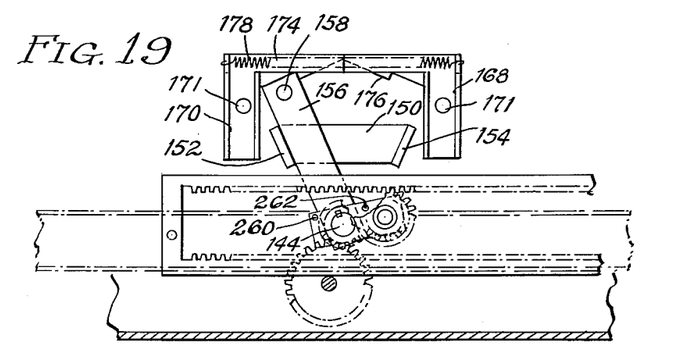
Fig. 19 is a view similar to that of Fig. 18 with the parts in another position of adjustment.
Figure 20:
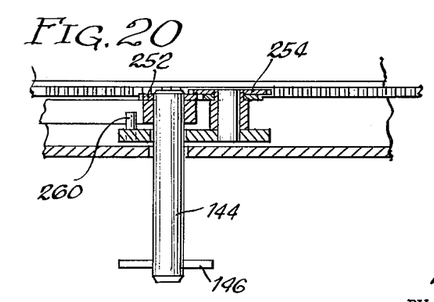
Fig. 20 is a sectional view through the measuring means of Figs. 18 and 19.

In Figs. 18, 19 and 20 illustration is made of a further modification in a means for recording displacement of the pistons in the described metering and proportioning device. In the modification illustrated in Figs. 18-20, use is made of a double rack assembly 240 secured to the underside of the piston rods 40—42 with the rack teeth 242 and 244 of the spaced racks extending inwardly in the direction towards each other. Located between the racks 240 and 240ª is a pinion gear 246 dimensioned to be slightly less than the distance between the rack teeth 242—244 so as to enable the teeth of the pinion gear 246 to be free of one rack while in engagement with the other but wherein the dimensional relationship between the pinion gear and racks is such that the gear teeth of the pinion will be engaged with one rack before release of the other. Under such circumstances, the rack bar cannot move in either direction without actuation of the pinion gear in turning movement. If the gear 246 should assume a position equidistantly between the two rows of gear teeth, the rack bar would be locked against operation thereby to stop the meter.

The objective is to provide positive means for measuring the total distance travelled by the displacement pistons in either direction and thus it is desirable to embody elements in the construction which, as in the previously defined modification, will insure rotational movement of the pinion gear 246 in the same direction independently of the direction of movement of the rack bars. For this purpose, the pinion gear 246 is mounted for rocking movement between the two rows of rack teeth. The pinion gear is mounted for rotational movement on a pin 248 offset towards the end of mounting plate 250. The plate is provided with an opening through which the pin 144 extends with sufficient clearance to permit the supporting plate 250 to turn freely about the pin. Also mounted on pin 144 for free rotational movement is an idling gear 252 positioned to engage a second gear 254 which is mounted on the shaft 248 below the pinion gear 246.

The idler gear 252 also engages a gear 256 which is keyed to shaft 258 to which the counting device, such as a Veeder-Root counter or odometer is attached.

Also mounted on the plate 250 are a pair of pins 260 and 262 which project upwardly from the plate 250 in spaced apart relation. The pins are arranged to be engaged by the lever arm 156 during movement to control the operation of the valve member and the pins are so positioned as to cause the supporting plate 250 to be rocked about the pin 144 as a pivot to adjust the pinion gear 246 as between the two rack bars. Thus when the lever arm 156 rocks from one position to the other, it strikes one of the pins 260—262 to cause the plate 250 to shift over a small arc simultaneously to transfer the pinion gear 246 from one rack to the other. The pinion gear 246 will remain in mesh with the rack teeth on one side until the lever arm 156 is reversed whereupon the pinion gear will cross over to the opposite rack concurrently with the reversal of flow of liquid through the control valve in response to shifting movement of the lever arm.

Thus the linear movement of the pistons 40—42 will be transmitted directly to the pinion gear 246 to effect its rotational movement in one direction. Movement of the pinion gear 246 will be transmitted through the meshing gear 252 to the second gear 258 for recording.

It will be apparent from the foregoing that I have provided a new and novel concept with respect to the proportioning of one liquid with respect to the flow of another wherein the proportion can be varied accurately from zero to any reasonable value and wherein the amount of liquid which is caused to flow from the device can be accurately measured and recorded for concurrent use of the device as a proportioning means and as a liquid metering means. It will be apparent from the foregoing that the proportioning system is accurate in its operation notwithstanding the amount of fluid or liquid that is caused to flow and without limitation as to the amount of material being proportioned. It is possible to secure delivery of minute amounts of a liquid in exact proportion to the flow of a primary liquid.

It will be understood that the side cylinder assembly may be repeated by additional assemblies of the same construction on or about the housing for take-off from the proportioning bar to effect the flow of more than one fluid in proportion to the flow of a primary fluid.

It will be understood that changes may be made in the details of construction, arrangement and operation without departing from the spirit of the invention, especially as defined in the following claims.

I claim:

1. A proportioning device for fluids comprising a main fluid displacement pump including a main cylinder having inlet and outlet ports at opposite end portions thereof for fluid flow therethrough into and out of the main cylinder and a piston and piston rod reciprocable within said cylinder between said ports for effecting fluid displacement, a proportioning fluid displacement pump including a proportioning cylinder having inlet and outlet ports in opposite end portions thereof for fluid flow therethrough into and out of the proportioning cylinder and a piston and piston rod reciprocable within said proportioning cylinder between said ports for effecting fluid displacement, a proportioning bar mounted for axial displacement with said main piston and piston rod, means for adjusting said proportioning bar at an angle with a plane through the axis of the main piston and piston rod, and an operative connection between said proportioning bar and the proportioning piston and piston rod whereby the proportioning piston and rod are displaced within the proportioning cylinder responsive to displacement of the piston and piston rod of the main fluid displacement pump and in proportion thereto depending upon the angular relationship of the proportioning bar.

2. A proportioning device for liquids as claimed in claim 1 in which the proportioning piston and rod are mounted for linear movement at about right angles with the direction of movement of the main piston and rod.

3. A proportioning device for liquids comprising a main pair of aligned piston and cylinder assemblies spaced one from the other, a main piston rod common to both of the main pistons, a pair of proportioning piston and cylinder assemblies aligned one with the other and spaced on opposite sides of the main piston rod and in angular relationship with respect thereto, a second piston rod common to both of the proportioning pistons for conjoint movement therewith, an elongate proportioning bar movable with the main piston rod and mounted at an angle with respect to the direction of such movement the proportioning bar providing a cam surface on its edge, lying in a plane parallel with the axes of the main and proportioning piston and rod in operative engagement with the cam surface of the proportioning bar for effecting displacement of the second piston rod in proportion to the angular position of the bar with its direction of movement and in response to movement of the main piston rod.

4. A proportioning device for liquids as claimed in claim 3 in which the proportioning piston rod moves at right angles to the main piston rod during movement of the respective pistons.

5. A proportioning device for liquids as claimed in claim 3 in which the proportioning bar is pivotally mounted at one end for angular adjustment.

6. A proportioning device for liquids as claimed in claim 5 which includes means for effecting displacement of the bar about its pivot for angular adjustment.

7. A proportioning device for liquids as claimed in claim 5 which includes a bearing member onto which the other end of the bar is pivoted, a bearing block mounted onto the piston rod, a threaded shaft extending through the bearing block into threaded engagement with the bearing member to effect displacement thereof along the shaft responsive to movement of the shaft, and means for effecting turning movement of the shaft in either direction to raise and lower the bar about its pivot.

8. A proportioning device as claimed in claim 3 in which the proportioning bar extends through an opening in the proportioning piston rod for enabling sliding movement of the bar through the rod.

9. A proportioning device as claimed in claim 8 which includes anti-friction means in the rod in operative engagement with the proportioning bar to minimize frictional resistance to relative movement.

10. A proportioning device as claimed in claim 9 which embodies means constantly urging the anti-friction means from opposite directions against the proportioning bar but with a force greater than the force required to effect displacement of the proportioning pistons in their respective cylinders.

11. A proportioning device as claimed in claim 3 in which the pistons include extensible diaphragm members movable with the piston head and having the edge portions secured in sealing relation to the adjacent wall of the cylinder to effect liquid flow by displacement of the diaphragm members.

12. A proportioning device for liquids comprising a pair of aligned piston and cylinder assemblies spaced one from the other, a piston rod common to both of the pistons, a pair of proportioning piston and cylinder assemblies aligned one with the other and spaced on opposite sides of the piston rod and in angular relationship with respect thereto, a second piston rod common to both of the proportioning pistons for conjoint movement therewith, an elongate proportioning bar movable with the main piston rod and mounted at an angle with respect to the direction of such movement, an operative connection between the proportioning piston rod and the proportioning bar to effect displacement of the rod in proportion to the slope of the bar and in response to movement of the main piston, a means for determining the displacement of the main cylinders for metering the liquid comprising a pair of rack bars having facing racks, means interconnecting the main piston rod and the racks for conjoint movement, one of said racks being arranged in a plane offset from the plane of the other, a shaft extending upwardly between the rack bars, a pair of pinions mounted for free rotational movement on the shaft with the teeth of one pinion in meshing engagement with the teeth of one rack and the teeth of the other pinion in meshing engagement with the teeth of the other rack, clutch means operative to effect conjoint movement between one pinion and the shaft during rotational movement in one direction and between the other pinion and the shaft during rotational movement in the other direction thereby to effect rotational movement of the shaft in one direction only responsive to movement of the rack bars in either direction, and means operatively engaging the shaft to record the amount of rotation.

13. A proportioning device as claimed in claim 3 which includes a valve for controlling the flow of liquids comprising an elongate housing having a chamber in the upper portion of the housing, a pair of spaced annular chambers about the central portion of the housing and a chamber in the lower portion of the housing, passages in the housing joining the upper chamber to one of the annular chambers, other passages joining the upper chamber to the other of said annular chambers and a passage joining the upper chamber to the lower chamber, means communicating one of said annular chambers with the head end of one of said cylinders for liquid flow therethrough, other means connecting the other of said annular chambers with the other of said cylinders above the piston for liquid flow therethrough, an inlet for feeding liquid into the upper chamber, an outlet for flow of liquid from the lower chamber, a valve plate separating the upper chamber from said passages having openings in registry with the passages in communication with one annular chamber when in one position of adjustment and in communication with the other passages in another position of adjustment, and an undercut in the valve plate interconnecting the passages out of registry with the openings in the valve plate with the passage to the lower chamber, and means for shifting the valve plate from one of its positions of adjustment to the other responsive to the change in direction of movement of the pistons.

14. A proportioning device as claimed in claim 13 in which the means for shifting the valve plate from one position of adjustment to the other comprises a lever arm mounted for rocking movement through an angle to shift the valve plate from one of its positions of adjustment to the other, spring means interconnecting the lever arm with the piston rods for urging the lever rod in the direction of displacement of the piston rods, means holding the lever arm against operation, and means for inactivating the holding means responsive to movement of the piston rod to the end of its stroke in the respective directions.

15. A proportioning device as claimed in claim 14 which includes means resiliently urging the lever arm in the direction away from its held position responsive to movement of the piston rod.

References Cited in the file of this patent

UNITED STATES PATENTS

| | | |
|---|---|---|
| 1,896,056 | Pepper | Jan. 31, 1933 |
| 1,932,976 | Lamb et al. | Oct. 31, 1933 |
| 1,939,899 | Hurlbrink | Dec. 19, 1933 |
| 2,045,046 | Mudd | June 23, 1936 |
| 2,262,031 | Meyer | Nov. 11, 1941 |
| 2,272,460 | Green | Feb. 10, 1942 |
| 2,350,045 | Kathe | May 30, 1944 |
| 2,427,429 | Waite et al. | Sept. 16, 1947 |
| 2,442,553 | Stienen | June 1, 1948 |
| 2,538,111 | Luster | Jan. 16, 1951 |
| 2,621,886 | Mueller | Dec. 16, 1952 |
| 2,676,754 | Hittle | Apr. 27, 1954 |
| 2,789,764 | Fray | Apr. 23, 1957 |

FOREIGN PATENTS

| | | |
|---|---|---|
| 136,428 | Australia | Feb. 20, 1950 |